United States Patent [19]
Davies

[11] Patent Number: 5,404,714
[45] Date of Patent: Apr. 11, 1995

[54] LOCK FOR AN ENGINE THRUST REVERSER

[75] Inventor: Stephen H. Davies, Telford, England

[73] Assignee: Lucas Industries public limited company, West Midlands, England

[21] Appl. No.: 92,237

[22] Filed: Jul. 15, 1993

[30] Foreign Application Priority Data

Jul. 21, 1992 [GB] United Kingdom ................ 9215496

[51] Int. Cl.⁶ .............................................. F02K 3/02
[52] U.S. Cl. ................................................ 60/226.2
[58] Field of Search ................ 60/226.2, 230, 226.1; 239/265.29, 265.33, 265.31; 244/110 B, 129.5

[56] References Cited

U.S. PATENT DOCUMENTS

| 4,424,669 | 1/1984 | Fage . | |
|---|---|---|---|
| 4,437,783 | 3/1984 | Halin et al. . | |
| 4,468,941 | 9/1984 | Bascou . | |
| 4,586,329 | 5/1986 | Carlin | 60/226.2 |
| 4,790,495 | 12/1988 | Greathouse et al. | 60/230 |
| 4,922,713 | 5/1990 | Barbarin et al. | 60/226.2 |
| 4,966,327 | 10/1990 | Fage et al. | 239/265.29 |
| 5,035,379 | 7/1991 | Hersen et al. | 244/110 B |
| 5,267,438 | 12/1993 | Bunel et al. | 60/226.2 |
| 5,267,760 | 12/1993 | Carlin | 60/226.2 |
| 5,280,704 | 1/1994 | Anderson et al. | 239/265.19 |
| 5,359,848 | 11/1994 | Davies | 60/226.2 |

FOREIGN PATENT DOCUMENTS

| 046096 | 2/1982 | European Pat. Off. . |
| 060175 | 9/1982 | European Pat. Off. . |
| 542611 | 5/1993 | European Pat. Off. . |
| 2500537 | 8/1982 | France . |

Primary Examiner—Timothy S. Thorpe
Attorney, Agent, or Firm—Trexler, Bushnell, Giangiorgi & Blackstone, Ltd.

[57] ABSTRACT

A lock for an engine thrust reverser comprises a locking member, for example, in the shape of a fork, arranged to engage a locking pin of a thrust reversing member. In use, the thrust reversing member is held in an inoperative position by other locks such that no force is exerted on the locking member by the thrust reversing member. If the other locks fail, the thrust reversing member pushes against the locking member. Under such conditions the lock cannot be unlocked and consequently the thrust reversing member is prevented from being deployed.

7 Claims, 3 Drawing Sheets

LOCK FOR AN ENGINE THRUST REVERSER

The present invention relates to a lock for use with an engine thrust reverser.

Thrust reverser systems act to direct the thrust produced by an aero-engine in a forward direction so as to decelerate an aircraft. One type of thrust reverser system for a fan engine comprises a plurality of doors 1 arranged around the periphery of an engine 2, as shown in FIG. 1 of the accompanying drawings. The engine shown in FIG. 1 has four such doors, two of which are shown.

FIG. 2 shows the doors 1 in the open position. Each door is operated by an associated hydraulic actuator 3. In the open position one part of the door extends outwardly to direct gas flow from the engine in a forward direction and another part of the door extends inwardly to impede the gas flow to the rear of the engine.

According to a first aspect of the present invention there is provided a lock for an engine thrust reverser comprising a locking element biased to engage a thrust reversing member and electromechanical means for unlocking the lock.

The thrust reversing member may be a door provided on an engine for redirecting a flow of gas from the engine.

Preferably the locking element is movable between a first position for preventing deployment of the thrust reversing member and a second position for allowing deployment of the thrust reversing member.

Preferably the locking element is a fork pivotable between the first and second positions.

Advantageously the fork is urged towards the second position by a torsion spring.

Preferably the locking element engages a closure pin or lip secured to or integral with the thrust reversing member. Advantageously no force is applied to the locking element from the thrust reversing member so as to urge the locking element towards the second position when the thrust reversing member is at an inoperative position.

Advantageously the lock will not unlock when a load is applied to the locking element so as to urge it to the second position by the thrust reversing member, even when a command to unlock has been given to the lock.

Preferably the electromechanical means is a solenoid. The solenoid may be arranged to move a locking pin between third and fourth positions for selectively engaging and disengaging a portion of the fork, respectively. Advantageously the portion and the locking pin cooperate to form a ratchet such that the fork may move from the second position to the first position when the solenoid is not actuated to move the pin to the fourth position, while preventing movement from the first position to the second position.

The closure pin may cooperate with the fork to move the fork to the first position during the movement of the thrust reversing member to the closed or inoperative position.

According to a second aspect of the present invention there is provided an engine thrust reverser comprising at least one thrust reversing member and a plurality of locks for locking the or each thrust reversing member at an inoperative position, at least one of which locks is a lock according to the first aspect of the present invention.

Preferably the or each lock according to the first aspect of the present invention is arranged such that it is not subjected to a load when the thrust reversing member is in the closed or inoperative position and the or each other lock is locked to secure the thrust reversing member.

Advantageously the locks engage the thrust reversing member at respective different positions. For example, a closure pin may be provided for cooperation with only one lock. If more than one lock requires a closure pin, then more than one closure pin, or a closure pin divided into first and second portions with a support there-between, may be provided. By ensuring that each lock engages the thrust reversing member at a respective position a high integrity locking system may be provided having increased protection against accidental operation of a thrust reverser.

The present invention will further be described, by way of example, with reference to the accompanying drawings, in which.

Figure 1:
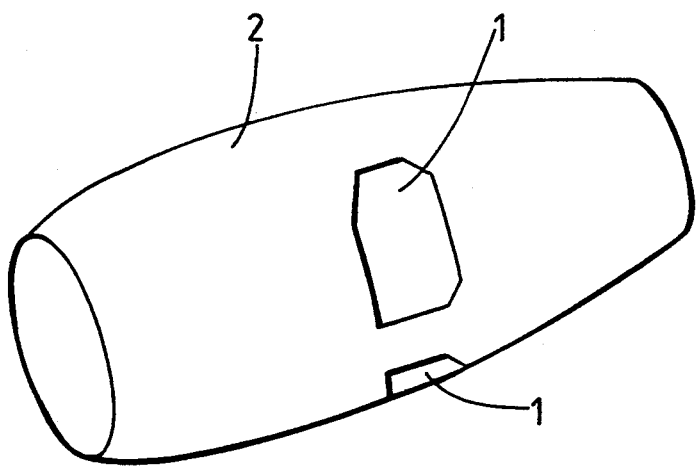
FIG. 1 is a perspective view of a gas turbine aero-engine having a door type thrust reverser system.
Figure 2:
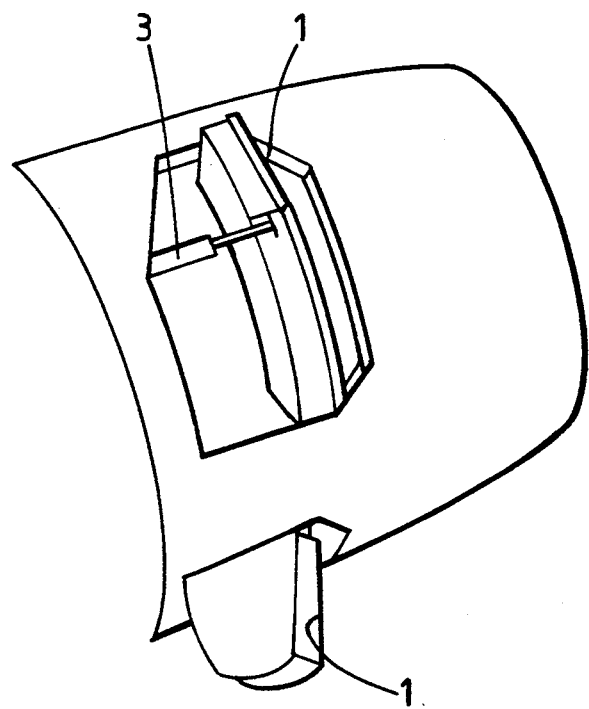
FIG. 2 shows the reverser shown in FIG. 1 in the operating position.
Figure 3:
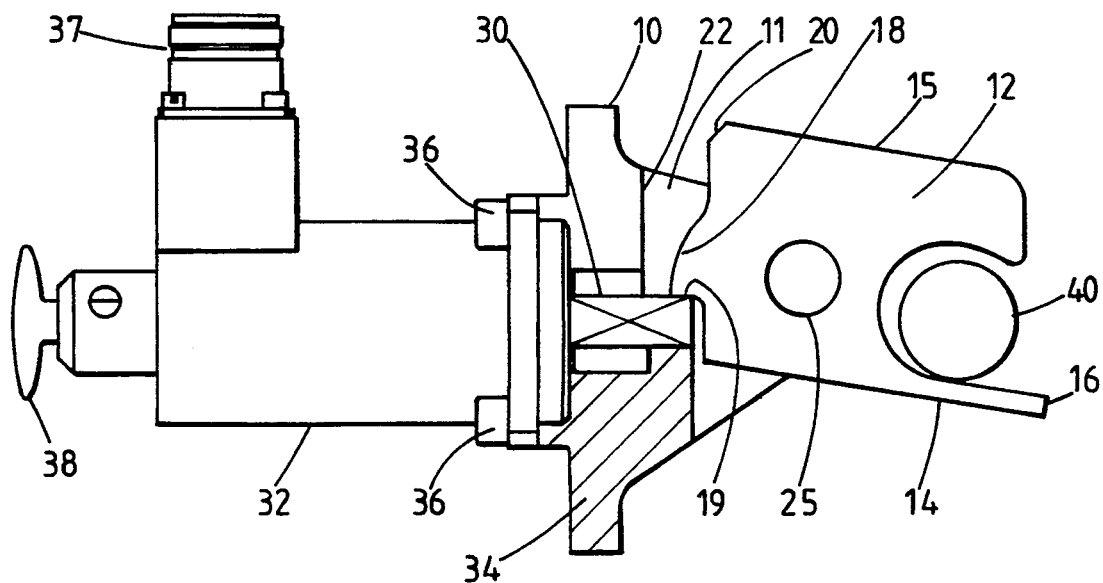
FIG. 3 is a cross section of a lock constituting an embodiment of the present invention shown in a closed and locked status.
Figure 5:
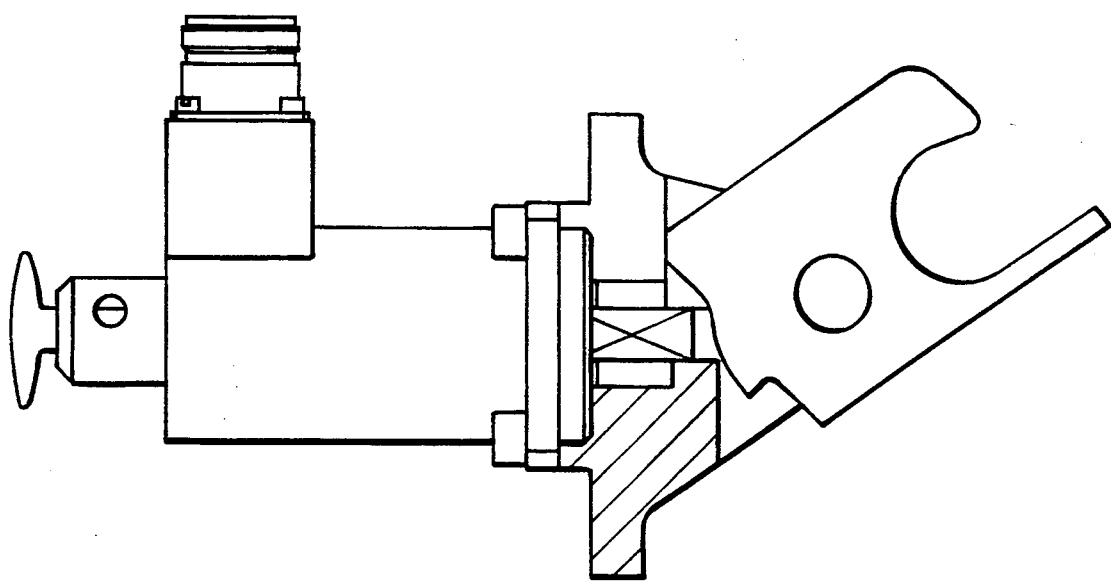
FIG. 5 shows the lock of FIG. 3 in an open position.
Figure 6:
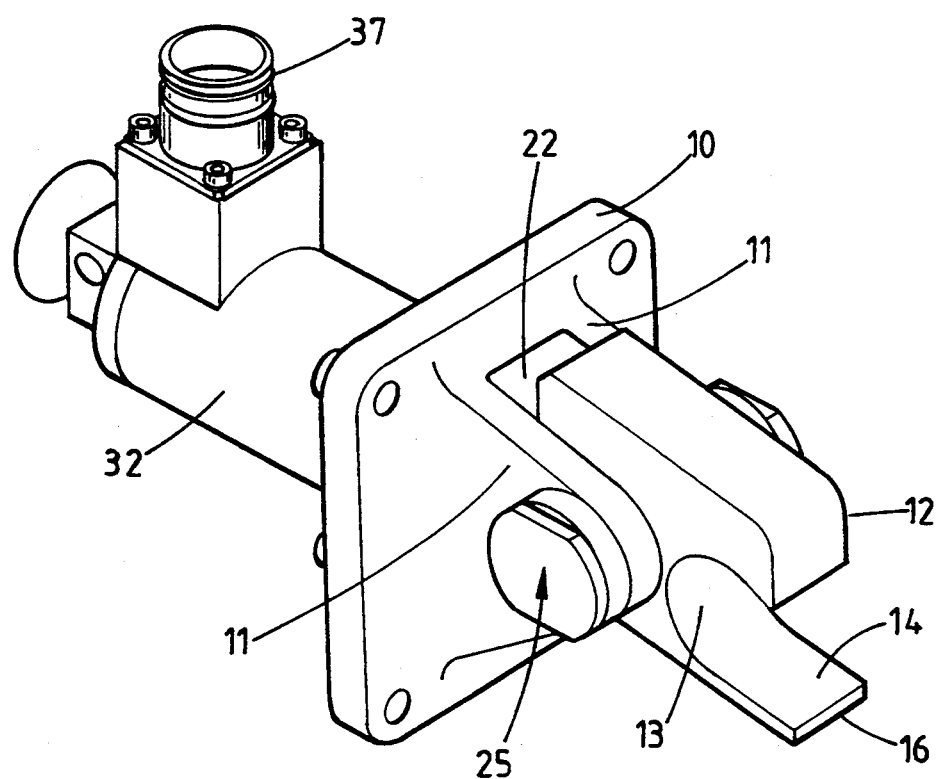
FIG. 6 is a perspective illustration of the lock shown in FIG. 3.

The lock has a plate 10 for securing the lock to a suitable support within an aero-engine. Two lugs 11 extend from a first side of the plate 10. The lugs 11 are spaced apart and act as supports for a pivoted fork 12 held between the lugs 11. The fork 12 is generally rectangular with a "C" shaped recess 13 formed in the side facing away from the plate 10, that is the right hand side of the fork 12 with the lock orientated as shown in FIG. 3. The lower edge 14 of the fork 12 extends further to the right than does the upper edge 15 of the fork, there by forming a protruding lip 16. The lower edge of the "C" shaped recess runs parallel with the lower edge of the fork 12. A lug 18 extends from the side of the fork 12 facing the plate 10. The lug 18 has a face 19 for selectively engaging a movable pin 30 actuated by a solenoid 32. The lug 18 is profiled such that movement of the fork 12 from an open position, as shown in FIG. 5, to a closed position shown in FIG. 3 is not inhibited by the pin 30, the pin 30 being pushed into the solenoid as the fork 12 pivots. The pin 30 is caused to move outwardly from the solenoid by biasing means when the fork reaches the closed position, thereby preventing pivoting of the fork back to the open position until the solenoid is actuated to retract the pin 30.

A further face 20 is formed between the upper edge 15 and the side of the fork 12 facing the plate 10. The face 20 abuts a surface 22 intermediate the lugs 11 to delimit the open position of the lock.

A pivot 25 holds the fork 12 between the lugs 11. A torsion spring (not shown) urges the fork towards the open position.

The pin 30 is moved by the solenoid 32 attached to the second side of the plate 10. The solenoid acts to move the pin 30 in a direction parallel to the longitudinal axis thereof. A spring within the solenoid biases the solenoid to move the pin 30 to the position shown in FIG. 3, so that the face 19 engages with the pin 30, thereby holding fork 12 in the closed position.

An opening force acting on the fork 12 is converted by the face 19 to a downwardly acting force on the pin 30. A support 34 is provided to prevent downward movement of the pin 30 as a consequence of the force being exerted by the face 19.

The solenoid 32 is connected at a first end to the plate 10 by bolts 36. A connector 37 is provided on the solenoid 32 so as provide electrical connections to the solenoid for the actuation thereof. A handle 38 extends from a second end of the solenoid opposed to the first end. The handle allows manual operation of the lock, for instance by service personnel.

Each door of the thrust reverser is actuated by the respective hydraulic actuator 3 which includes an internal lock to lock the actuator in the door closed (inoperative) position. Furthermore each door has a primary lock which is mechanically latched when the door is in the closed position. The primary lock comprises a hook which is selectively engagable with a door pin. The locking mechanism within the hydraulic actuator is referred to as a secondary lock. The primary and secondary locks act to hold the door 1 against an air tight seal and each is released by the application of hydraulic pressure when deployment of the door is required and hydraulic pressure is applied to operate the actuator. At least one of the primary and secondary locks is under load when the door 1 is at the closed position.

In use, the lock illustrated in FIGS. 3 to 6 acts as a tertiary lock. A door pin 40 is held within the "C" shaped recess when a door 1 of a door type thrust reverser is in the closed position. During the door closing operation the pin 40 cooperates with the lip 16 to move the fork 12 from the position shown in FIG. 5 into the position shown in FIG. 3, thereby locking the door 1 closed. The pin 40 is arranged not to abut the upper surface of the "C" shaped recess when one or both of the primary and secondary locks are engaged at the end of the door closing stroke of the actuator. Thus the only force to urge the fork to the open position is provided by the torsion spring of the pivot, and this force is opposed by the pin 40 of the door 1. Consequently little or no force acts between the face 19 and the pin 30.

Figure 4:
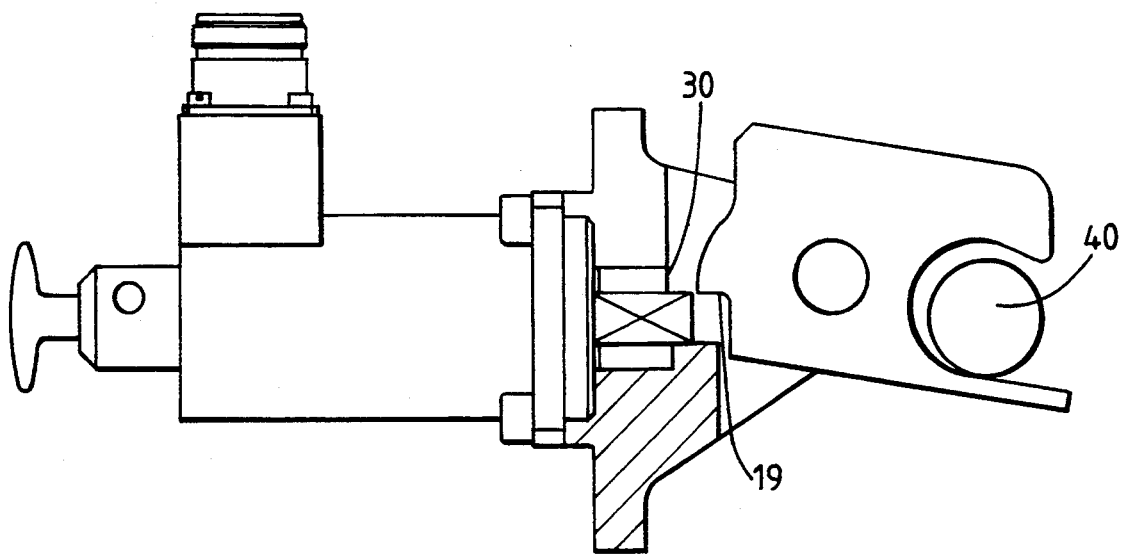
FIG. 4 shows the lock of FIG. 3 closed but unlocked.

In order to deploy the thrust reverser, the primary and secondary locks are released by the application of hydraulic pressure and the solenoid 32 is electrically actuated to retract the pin 30 so that pin 30 and the face 19 of the lug 18 are unable to abut each other, as shown in FIG. 4. The fork 12 is held in the closed position by the door pin 40 until the hydraulic actuator 3 opens the door 1. The fork 12 rotates to the open position under the action of the torsion spring as the door 1 opens.

If the primary and secondary locks are accidentally unlocked, for example due to a fault in the hydraulic control lines to the locks, no electrical signal to unlock will be transmitted to the solenoid 32 and pin 30 will remain in the extended position. Aerodynamic forces and the force provided by a seal around the door causes the door 1 to move until the door pin 40 engages the upper surface of the "C" shaped recess and causes the fork to become loaded in the opening direction. The force exerted by the face 19 on the pin 30, and the opposing force exerted by the support 34 on the pin 30 act to hold the pin 30 against longitudinal movement even if, due to a further fault, the solenoid is actuated to retract the pin 30. Thus the door 1 is prevented from being deployed inadvertently. The face 19 and the upper surface of the pin 30 may be profiled, for instance to form intermeshing teeth, so as hold the pin 30 against movement when the fork 12 is loaded in the opening direction.

The slight movement of the door to the position when the door pin 40 engages the upper part of the "C" shaped recess may be detected by micro-switches positioned around the door, for example in the supporting frame of the aero-engine adjacent the door. The micro-switches may provide a signal to the pilot and/or a flight control computer to warn of a fault within the thrust reverser and to inhibit transmission of the electrical signal to actuate the solenoid 32.

For aero-engines having a plurality of thrust reversing doors spaced around the engine, a lock as hereabove described is provided for each door. The power supply to each of the solenoids may be independent of the power supplies to the other solenoids. Thus each lock is independently controllable. If a thrust reverser door on an engine of one side of an aircraft fails, the remaining doors of that engine may still be operated. Furthermore one of the thrust reverser doors of an engine on the other side of the aircraft may be inhibited from operation, by not energising the solenoid, so as prevent asymmetric forces being generated during the operation of the thrust reversers that would tend to skew the aircraft from its proper course.

It is thus possible to provide locks which are reliable and which are easily retro-fittable to existing thrust reversers without requiring modification of the locking systems already fitted to the thrust reversers.

It is possible that the lock according to the present invention may be used in conjunction with only one of the primary or secondary locks to provide a locking system requiring both a hydraulic and an electrical failure to cause inadvertent deployment of a thrust reverser member.

I claim:

1. A subsidiary lock for an engine thrust reverser, comprising: a locking element movable between a first position for preventing deployment of a thrust reversing member of the thrust reverser and a second position for allowing deployment of the thrust reversing member, said locking element being biased to engage the thrust reversing member and being moved from the second position to the first position when the thrust reversing member moves to an undeployed position thereof, said locking element having a first surface for abutting against the thrust reversing member so as to prevent deployment thereof when said locking element is at said first position, said first surface and the thrust reversing member defining a clearance therebetween when said locking element is at the first position and the thrust reversing member is at the undeployed position; a latching element urged towards a latching position; and an electromagnet for selectively urging said latching element away from the latching position, said locking element having a second surface for moving said latching element away from the latching position when said locking element moves from the second position to the first position and a third surface co-operating with said latching element at the latching position to prevent movement of said locking element from the first position to the second position.

2. A lock as claimed in claim 1, in which the thrust reversing member has one of a closure pin and lip, and said locking element engages the one of the closure pin and the lip.

3. A lock as claimed in claim 1, in which said locking element is a fork pivotable between the first and second positions.

4. A lock as claimed in claim 1, in which a force acting between said first surface and the thrust reversing member in a direction so as to urge said locking element towards the second position urges said third surface against said latching element when at the latching position so as to prevent movement of said latching element away from the latching position.

5. A lock as claimed in claim 1, in which said electromagnet comprises a solenoid having an armature constituting said latching element.

6. An engine thrust reverser comprising a thrust reversing member, at least one main lock for locking said thrust reversing member in an undeployed position, and a subsidiary lock for locking said thrust reversing member in the undeployed position, said subsidiary lock comprising: a locking element movable between a first position for preventing deployment of said thrust reversing member and a second position for allowing deployment of said thrust reversing member, said locking element being biased to engage said thrust reversing member and being moved from the second position to the first position when said thrust reversing member moves to the undeployed position, said locking element having a first surface for abutting against said thrust reversing member so as to prevent deployment thereof when said locking element is at said first position, said first surface and said thrust reversing member defining a clearance therebetween when said locking element is at the first position and said thrust reversing member is at the undeployed position; a latching element urged towards a latching position; and an electromagnet for selectively urging said latching element away from the latching position, said locking element having a second surface for moving said latching element away form the latching position when said locking element moves from the second position to the first position and a third surface co-operating with said latching element at the latching position to prevent movement of said locking element from the first position to the second position.

7. An engine thrust reverser as claimed in claim 6, in which said thrust reversing member comprises a closure pin for cooperating with said locking element.

* * * * *